US010110687B2

(12) United States Patent
Bahadori et al.

(10) Patent No.: US 10,110,687 B2
(45) Date of Patent: Oct. 23, 2018

(54) SESSION BASED WEB USAGE REPORTER

(75) Inventors: Hamid Bahadori, Redwood City, CA (US); Hemanth Puttaswamy, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1957 days.

(21) Appl. No.: 11/544,300

(22) Filed: Oct. 6, 2006

(65) Prior Publication Data

US 2008/0086558 A1 Apr. 10, 2008

(51) Int. Cl.
*G06F 15/173* (2006.01)
*G06F 15/16* (2006.01)
*H04L 29/08* (2006.01)
*G06F 11/34* (2006.01)
*G06F 17/30* (2006.01)

(52) U.S. Cl.
CPC .......... *H04L 67/22* (2013.01); *G06F 11/3438* (2013.01); *G06F 11/3495* (2013.01); *G06F 17/3089* (2013.01); *H04L 67/02* (2013.01); *H04L 67/1002* (2013.01); *G06F 2201/875* (2013.01); *H04L 67/1023* (2013.01); *H04L 67/1027* (2013.01)

(58) Field of Classification Search
CPC ... H04L 67/22; H04L 12/2602; G06F 11/3438
USPC ........ 705/14, 10, 26, 27; 709/224, 201, 202, 709/217, 219; 707/7, 205; 711/117, 147, 711/170, 173, 216
See application file for complete search history.

(56) References Cited

U.S. PATENT DOCUMENTS

| | | | |
|---|---|---|---|
| 5,764,912 A * | 6/1998 | Rosborough | 709/224 |
| 6,266,649 B1 | 7/2001 | Linden et al. | |
| 6,782,370 B1 | 8/2004 | Stack | |
| 6,912,505 B2 | 6/2005 | Linden et al. | |
| 6,996,536 B1 * | 2/2006 | Cofino et al. | 705/26 |
| 7,089,304 B2 * | 8/2006 | Graham | 709/224 |
| 7,113,917 B2 | 9/2006 | Jacobi et al. | |
| 7,216,236 B2 * | 5/2007 | Kou et al. | 713/183 |
| 7,359,935 B1 * | 4/2008 | Karipides et al. | 709/203 |
| 2002/0065912 A1 * | 5/2002 | Catchpole et al. | 709/224 |
| 2003/0084343 A1 | 5/2003 | Ramachandran et al. | |
| 2004/0024880 A1 * | 2/2004 | Elving et al. | 709/227 |
| 2004/0054784 A1 * | 3/2004 | Busch et al. | 709/228 |
| 2004/0070606 A1 | 4/2004 | Yang et al. | |
| 2004/0205157 A1 * | 10/2004 | Bibelnieks et al. | 709/218 |
| 2005/0144067 A1 * | 6/2005 | Farahat et al. | 705/14 |
| 2005/0188080 A1 * | 8/2005 | Motsinger et al. | 709/224 |
| 2006/0015504 A1 * | 1/2006 | Yu et al. | 707/10 |
| 2007/0100994 A1 * | 5/2007 | Armstrong et al. | 709/224 |
| 2007/0118693 A1 | 5/2007 | Brannon et al. | |
| 2008/0162397 A1 * | 7/2008 | Zaltzman | 706/48 |
| 2010/0198772 A1 * | 8/2010 | Silverman et al. | 706/52 |

* cited by examiner

*Primary Examiner* — Madhu Woolcock
(74) *Attorney, Agent, or Firm* — Winstead, P.C.

(57) ABSTRACT

A system groups the data into sessions to allow tracking and evaluation of individual user behavior. By grouping clicks of a user in a session, the pattern of clicks can be observed, such as which path or pattern of clicks leads to a purchase. In particular, the session data is organized by session, using session transformers or "sessionizers," before it is provided for database storage, enabling real-time session based analytics.

23 Claims, 4 Drawing Sheets

SESSION BASED WEB USAGE REPORTER

BACKGROUND OF THE INVENTION

The present invention relates to on-demand web analytics, and in particular to session-based analytics.

Companies hosting web sites have a need to monitor how effective those websites are. The most basic tracking approach is to record basics data on the number pages viewed and the number of visitors to the web site. More advanced applications track a host of additional detailed features and elements of a website. The data collected include what parts of a website a user clicks on, when a user chooses to include an item in the shopping cart, purchase an item, and other shopping actions, registration events, viewing of products, payments actions, etc. Typically, tags are associated with different resources on a web site to track such activities.

More recently, tracking has been done not just of URL based resources, but also of local applications downloaded from a web site as part of a web page and run locally on a user's computer. Such local applications include Flash and Ajax. This has been described as tracking the applications within a web resource by using ActionScript and/or Java Script, the languages used to write such applications.

The data collected by the tracking software is stored in a database, where it is analyzed, validated, checked and formatted. The processing and storing of the tracking data in the database requires substantial time. Examples of validating collected data include eliminating duplicate click data, and comparing the collected click data to established limits to eliminate probable click fraud. The data, after processing and based on established business rules, is then presented to the client (the company that owns the website) using various delivery mechanisms such as a browser application, data downloads, data exports, web based API, emails, and other delivery mechanisms.

A web site may also be tracked based on user sessions. IBM US Published Application No. 20040054784, entitled "Method, system and program product for tracking web user sessions" describes one such system. When a user requests a web page, code within the web page generates a unique identifier which is transmitted to the analytics server along with an identification of the web site and the referring web site. The analytics server then downloads a session cookie so that activity with respect to that session can be tracked.

Figure 1:
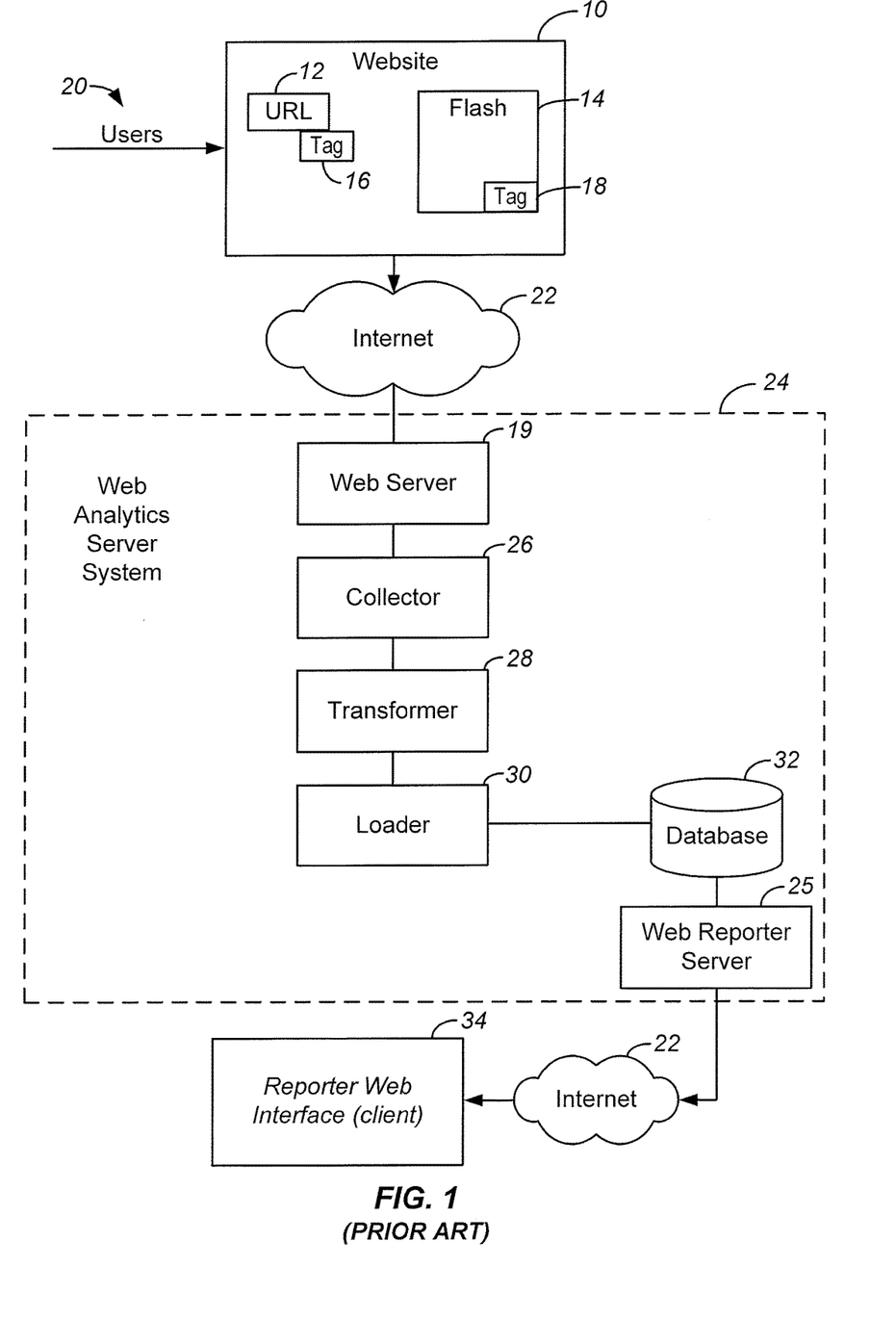
FIG. 1 is a block diagram of a prior art tracking system.

FIG. 1 is a block diagram of an example of a tracking system. A web server 10 provides web pages, flash, and other local applications 14 that are addressable by URLs 12. Each of these web based resources has an associated tag 16 and 18, respectively, for tracking clicks by users 20. The tags collect the user click information and transmit it over the internet 22 to a web analytics server or tracking server 24.

Web analytics server 24 collects the data received by a web server 19 with a collector component 26, and assembles queues of data in transformer components 28. The transformed data is then loaded into a database 32 by a loader 30. The data in the database is analyzed, checked, and validated over time, then provided to a user using various delivery mechanism such as a browser application, data downloads, data exports, web based API, emails, and other delivery mechanisms from a web reporter server 25 through Internet 22 to a client computer 34.

BRIEF SUMMARY OF THE INVENTION

The present invention applies where a system groups the data into user sessions data to allow tracking and evaluation of individual user behavior. By grouping clicks of a user in a session, the pattern of clicks can be observed. These patterns include paths or patterns of clicks leading to a purchase. In particular, in the present invention the user session data is organized and analyzed in RAM (Random Access Memory) by engines defined as session transformers or "sessionizers" to enable presentation of the data in real time before it is stored in any database.

This approach speeds up the processing, analyzing, and presentation of tracking data orders of magnitude faster by utilizing the technology claimed in this patent using the in-memory processing of such data in computer RAMs.

The invention also provides in one embodiment the ability to track a very large number of sessions which may requires many session transformers working in a multithreaded massively parallel model of computation and processing. Collected data is then sessionized by using session IDs which are provided by the analytic server as part of the initial session dialogue. Clicks from different users may be sent to different web servers in the analytics server system. Multiple collectors pull this data and provide it in multiple messaging queues to the sessionized transformers based on a hash ID algorithm. A collector component is assigned to each web server. The collectors sort the data by session IDs, so that all data from the same session is routed to the same session transformer queue. Each queue goes to one session transformer component, insuring that all data related to the same session is analyzed, organized, formatted, and transformed by the same session transformer.

The sessionizer, prior to any long term database storage of the data organized as described above, aggregates and processes collected data for a session using any prescribed business logic or statistical analysis needed for the session metrics in memory and using computer processing RAMs. Examples of such processing include, but is not limited to, entry and exit pages of the session, the lengths of the sessions, the products browsed, bought and abandoned, missed sale opportunities, hypothesis testing and inferences on the collected data for any defined statistical analysis of such data. The session data is organized as a hierarchical data structure using technology that uses multiple levels of hashing and data analyses algorithms and structures. The collected data is organized by client (e.g., the company with the website), then is organized as sets of sessions.

The session data is organized in different formats and the using various messaging systems for output to different targets as follows:
1—real time in-memory streaming for real time in-memory analytics 2—real time in memory streaming through a variety of application APIs for other applications. 3—used for long term database loading or other storage media.

In real-time in-memory processing and presentation of collected data three categories of session data are defined: (1) completed sessions; (2) in flight sessions (a session in progress); and (3) a session current snapshot (a summary of all session activity up to now for a session in progress).

Also, in one embodiment, the data can be presented by defined user behavior segments (e.g., users that bought the same article, used the same search words, etc.) using the same real-time in-memory processing and presentation of collected data as defined above.

DETAILED DESCRIPTION OF THE INVENTION

Overall System

Figure 2:
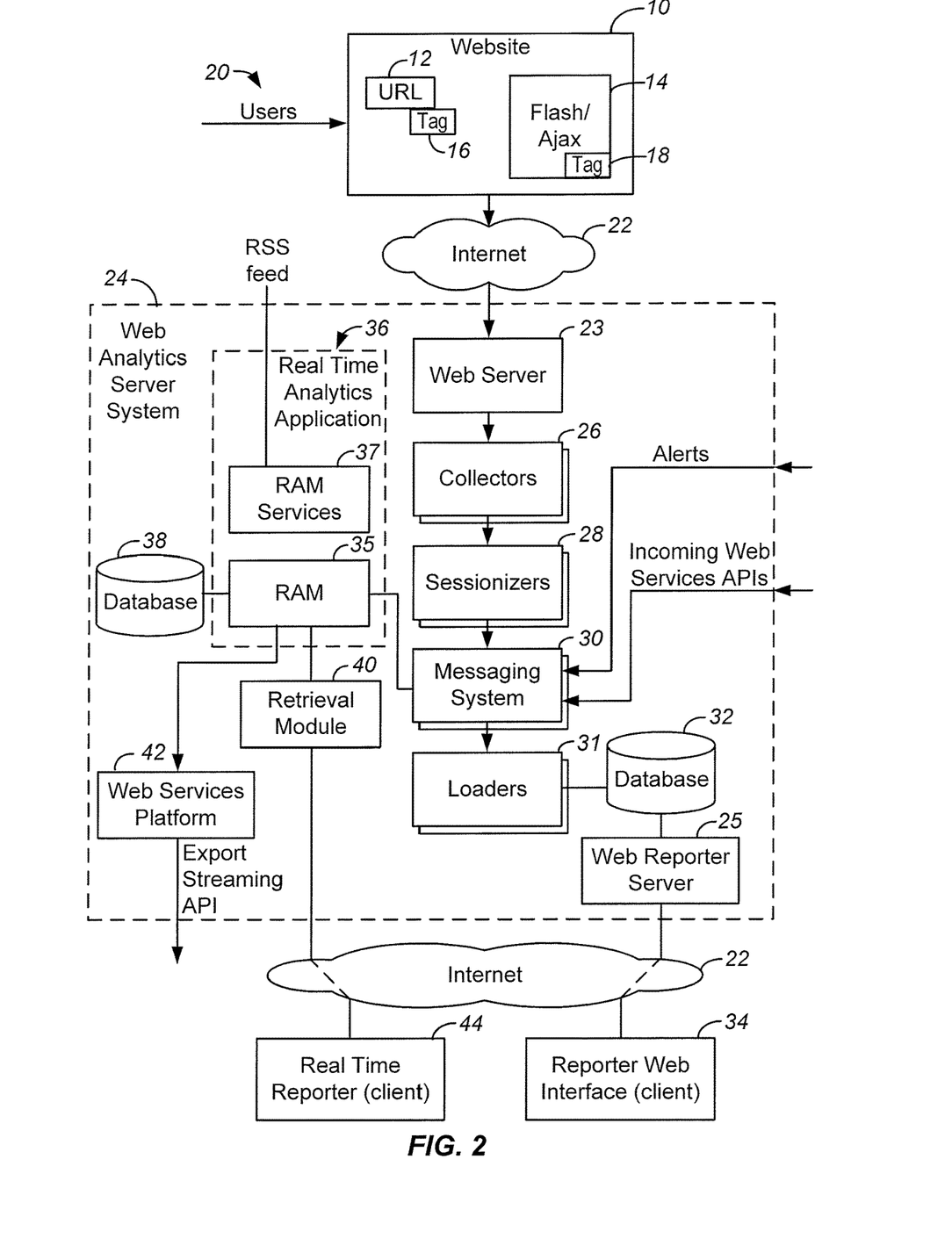
FIG. 2 is a block diagram of a real-time tracking system using RAM according to an embodiment of the invention.

FIG. 2 is a block diagram of a tracking system based on user session data according to an embodiment of the present invention. A web server 10 provides web pages which are downloaded to a client (user) computer, and include URLs 12 and Flash, Ajax, Java, or other local applications 14. Each of the components referred to has associated metadata request elements 16 and 18, respectively, for tracking clicks by the users 20. The metadata request elements collect the user click information and transmit it over the internet 22 to a web analytics or tracking server 23.

Data is initially provided to a group of web servers, or pixel servers, 23 as a log of click stream data. Multiple collectors 26 pull the data, sort the data by session (using the session ID), and provide the data in multiple messaging queues to the sessionizers (transformers) 28. The data for the same session is sent to the same sessionizer based on a hash ID algorithm. The sessionizers organize the collected data as discussed below, then provide it in different formats and based on various business and statistical logic through a variety of different messaging systems 30 to different targets that include but are not limited to: 1—real time in-memory streaming for real time in-memory analytics 2—real time in memory streaming through a variety of application APIs for other applications. 3—used for long term database loading or other storage media.

Any of these messaging systems 30 can pass on any number of well defined alerts coming from any external sources to the RAM 35. RAM 35 may also directly receive an RSS feed through the internet. Thus, data from different sources including the session data from the sessionizer, the alerts or other data types from other external sources can be combined and processed, using any business logic or statistical data analysis in the RAM and made available for real time viewing to any target. Examples include, for the same client, not only web data, but call center data, bricks and mortar store data, giving a complete overview of business models defined and represented using the data.

The data in RAM 35 is provided to a variety of web services platforms 42, which are available for external vendors to pull through any APIs for export streaming. Also, the data from RAM 35 is accessed by a real time browser based application 44. Real-Time Analytics Application 36 includes RAM for storage 35 and RAM based services 37. RAM based services 37 are programs stored in the main memory of a server which controls the storing, processing, aggregating, accessing, authenticating, authorizing, etc. of data in the RAM. Such services include a de-serializing service, an aggregator service, a localizer service, a security service, a messaging service, a recovery service, and/or any other service defined on the data in RAM.

Real time reporter 44 may reside on a client computer or may be downloaded from a web analytic server, and can use Flash, Ajax, a local application or other methods for requesting and rendering reports. The data for the reports is requested from Web Analytics Server 24 across the Internet 22. Independent modules within the real time reporter program 44 will retrieve data in RAM 35 from real time analytics application 36 asynchronously using interface module 40, through different protocols (HTTPs, Flash, Ajax, etc.) for the real time interactions.

The system of FIG. 2 is designed to respond at the speed of accessing the data in memory and processing the data in memory. It can also handle data for a large number of clients across a large number of geographically distant web servers. In one embodiment, collectors 26 include a large numbers of servers, with associated disk drive storage. There could typically be fewer servers for sessionizers 28, and even fewer servers making up messaging system 30, all with associated disk drives. Loaders 31 may include dozens of servers and associated disk drives. RAM 35 could be a single or multiple banks of RAMs.

Session Based Tracking

Figure 3:
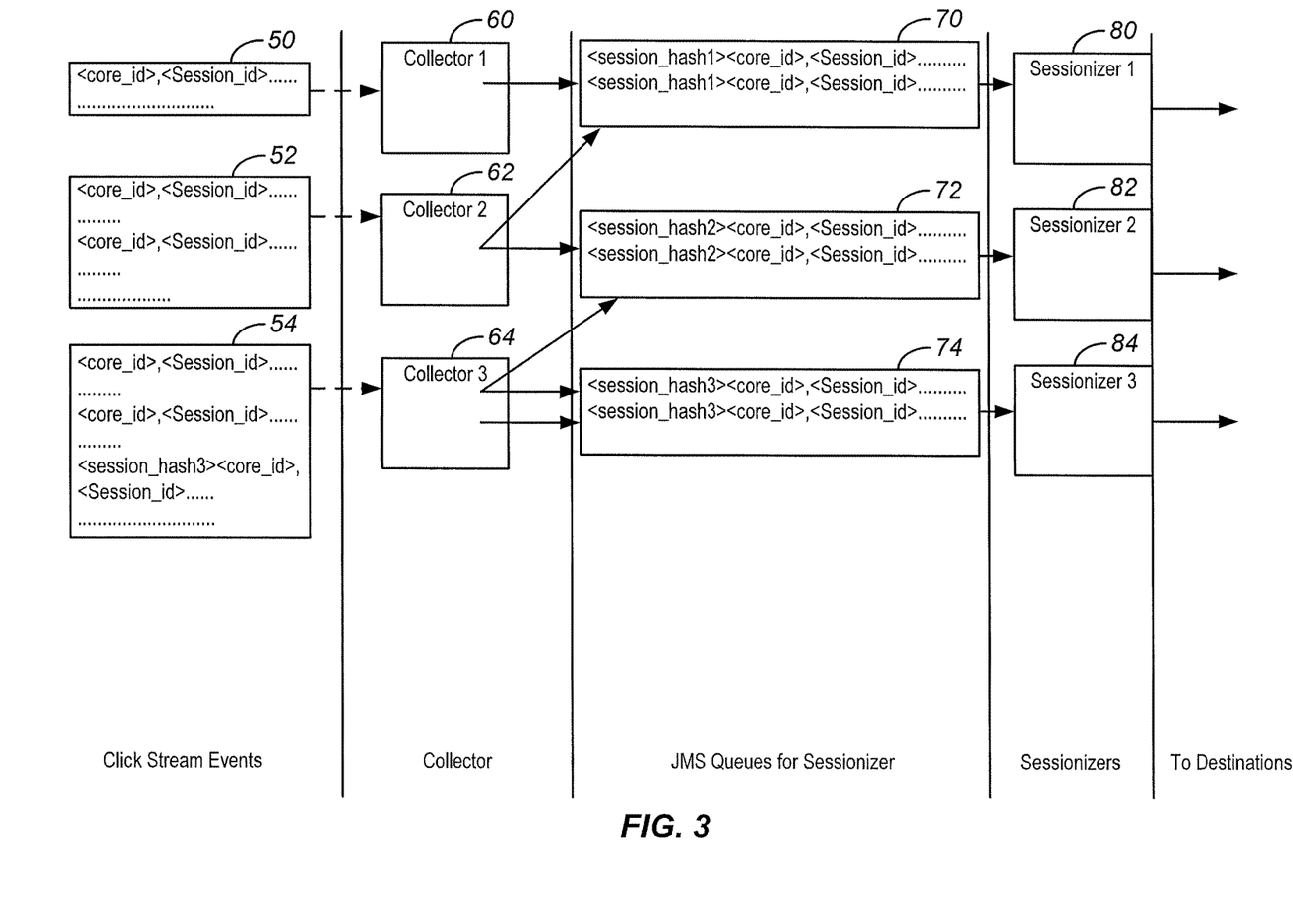
FIG. 3 is a diagram of the flow of tracking user session data according to an embodiment of the invention.

FIG. 3 is a diagram of the flow of session tracking data according to an embodiment of the invention. Tracked data is sent over the Internet by metadata request elements downloaded to the browser of the computer utilized by any visitor to a client web site. as described above. This data is grouped into click stream events 50, 52 and 54 which are sent to collector 26 on the web analytics server system. In addition to the tracking ID of the prior art (here, the cookie id is labeled <core_id>, for Coremetrics ID), a session ID is created and assigned by the web analytics server to each new session. The log of information tracked by the metadata request elements is thus associated not only with a core ID, but a session ID as well.

Each activity tracked and stored includes the core ID and the session ID. Each stored activity is assigned a time stamp. The time stamp allows establishing the sequence of events and allows easy analysis of the activities that led to other activities. Any session is maintained active as long as the user has his browser open, with a timeout ending the session if there is no activity for a designated time period.

After the click stream events are transmitted over the internet to the web analytics server system, they are received by various instances of web servers, 60, 62, and 64. The collectors examine the session ID, and route the data to appropriate hashed message queues 70, 72 and 74 based on hash bucket IDs. Thus, all data on the same session is sent to the same queue. In the course of such processing, load balancing is performed. The different collectors communicate with each other to identify queues that have been assigned to a particular session ID. If a new sessionizer is added to the topology of the current sessionizers, they automatically reconfigure with all the routing changes.

The data from the queues are sent to sessionizer instances 80, 82 and 84 residing in sessionizer servers 28. The sessionizers are transformers that take individual click data and transform it into different formats, such as data warehouse loadable data, data optimized for real time analysis, etc. In addition, the click events are aggregated to give the complete session data. In order to be able to completely recover from any disaster, sessionizers, store their in-memory data based on a defined policy in hierarchical common storage. Session Objects are stamped with their segmentation group IDs as and when the information is available in a click. For example, when an order is complete a click is processed, a segmentation ID based on the purchase order level can be stamped, and another segment ID based on the kind of goods bought can be stamped.

Figure 4:
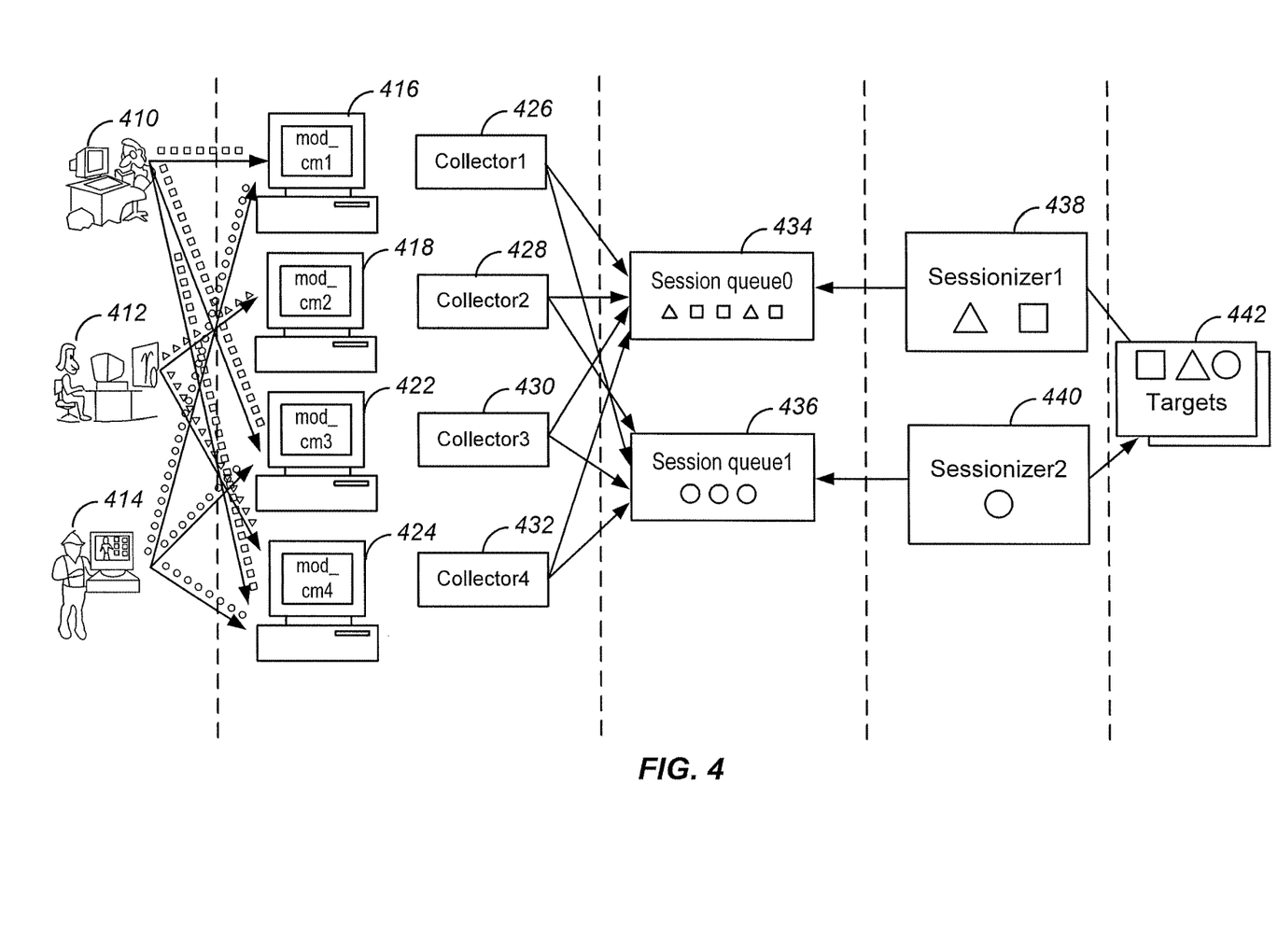
FIG. 4 is a diagram of the operation of the sessionizers with respect to click streams from different users according to an embodiment of the invention.

FIG. 4 illustrates the operation of the sessionizers with respect to click streams from three different users. Users 410, 412 and 414 are shown accessing a website. For simplicity, all 3 users are accessing the same website in this example. The web analytic server is actually located on geographically disperse server farms, with multiple web analytics servers at each location. Load balancers can route a user clicks to any of the web analytic servers.

In the example shown, 4 web analytic servers 416, 418, 420 and 422 are shown (web server 23 of FIG. 2). The clicks of user 410 are represented by data paths with small squares. The data path of user 412 is represented by triangles, and user 414 by circles. As can be seen, the first click (or series of clicks) by user 410 connects to web analytic server 416, the second click connects to server 422 and the third click connects to server 424. For user 412, the first click connects to server 418 and the second click connects to server 424. For user 414, the first click connects to server 416, the second click to server 422 and the third click to server 424.

The information on each click, as well as session ID and a core ID from a cookie, are sent as click streams to a log target file on the web analytics server. Multiple collector instances 426, 428, 430 and 432 pull the data from the target files, and sort and categorize it and then send data from the same user session to the same sessionizer. Shown are two sessionizer targeted messaging queues 434 and 436. As shown by the squares, triangles and circles, all the data for the current session from users 410 and 412 are sent to message queues 434 (for triangles and squares) 436 (for circles), while all the data for the current session from user 414 is sent to a queue 436 and onto sessionizer 440. The sessionizers put together all the data from a user session (as represented by the big square, triangle and circle), and send them in different formats to a different targets 442 (e.g., a database loader, real time RAM Based analytics server, exporting, etc.).

Alternate embodiments are possible. For example, part or all of the click streams could be sent from the website server rather than the user computer. The click streams could identify a desired collector, with the data being sent directly to that collector, or to a memory area in RAM dedicated to that collector. The collectors could be designated for a particular sessionizer, without having to sort between sessionizers. Any number of collectors and sessionizers could be used.

Once the session is complete the aggregated session object will be marked for completion and the completed session click stream data is available for different targets as explained above.

Metrics

The sessionizer data metrics provided include (1) in-flight metrics for sessions that are still active; (2) completed session metrics and (3) current session or snapshot statistics (how many people are on the site, how many shopping carts are active, how many items are in carts, etc.). If there has been no activity for a predetermined time, a session is deemed timed-out, and thus completed.

The sessionizer, prior to long term database storage of the clickstream data, aggregates data for each session and calculates certain session metrics. For example, the start and end pages of each session are identified and labeled, the length of each session is calculated, the products browsed, bought and abandoned are identified, etc. The session data is organized as a hierarchical data structure using multiple levels of hashing. (1) The data is first organized by client (e.g., the company with the website), then (2) is organized as sets of sessions. (3) For each session, multiple sub tables can be provided, including: pages, products, technical properties; shopping carts; etc. High value sessions (e.g., more than 100 page views, order value greater than $100 etc.) can also be identified and grouped.

Segments

The segments can be any grouping of users and user's sessions based on defined properties or criterion. For example, users that came from Google can be grouped in one segment, and those that came from Yahoo! can be grouped in another. Multi-level segments can be established, such as users that came from Google, looked at the same product and bought the product. Users can be grouped by the search terms they use, or by articles bought. This allows a company marketer to target these segments. For example, if a segment for purchases of products from a certain retailer shows a spike, an ad or promotion directed to that retailer's products could be implemented immediately. Segments can be generated for completed sessions, for current (in-flight) session data, or for session snapshots.

The sessionizers use polls for new segments, or segment information could be pushed. As a new segment is defined, the data fitting that segment is made available. The sessionizer obtains new segment definitions from various sources, such as the real time reporter 44, reporter 34, or other tools. A user can define segments, and push them onto the sessionizer. This service retrieves data with segmentation expressions from the database periodically, validates retrieved expressions and locates them in a poll. These expressions will be used for filtering sessions.

Fraud Detection

In one embodiment, click fraud can be detected. The sessionizer can flag when there are more than a predetermined threshold (e.g., 5 or 10) of clicks on an ad during a single session or across sessions from the same machine. This can be flagged as probable click fraud, and reported to the client. A client can set the threshold, and can take appropriate action, such as not counting clicks from that machine in determining advertising payments.

Spoof Detection

Fraudulent accesses can also be flagged, such as by detecting when a suspiciously large number of page accesses are detected, or a large number of purchases. This can be done by setting thresholds, which individual clients can customize. Different types of spam can be filtered out, such as a hacker trying to record a large number of fraudulent purchases, or a large number of purchases with different credit cards from the same computer.

Disaster Recovery

The sessionizer can fully recover from a server crash. A current session snapshot is saved periodically as set by an administrator. The data is saved using hash buckets to store the data in flat files on secondary storage. Thus, after a crash, data can be quickly reloaded up to the last save time. For data after the last save time, the collectors pull the data from the target files again, and send to the sessionizers to reperform the sessionizer recovery operations. This strikes a balance between the amount of data that needs to be recomputed and the amount and timing of backup data stored in secondary storage.

It will be understood that modifications and variations may be effected without departing from the scope of the novel concepts of the present invention. For example, a single sessionizer could be used instead of a large number of sessionizers. In addition to monitoring clicks (of a mouse, trackball, etc.), other users actions could be monitored, including words highlighted by a user, the dwell time a user spends looking at a particular page, downloads, transactions, cursor movements, scrolling, and any other detectable actions of a user. Accordingly, the foregoing description is intended to be illustrative, but not limiting, of the scope of the invention which is set forth in the following claims.

What is claimed is:

1. A method for tracking web usage data, comprising:
assigning a session ID to a new user session, the new user session tracking web usage data of a user on a web server;
including said session ID with monitored action data being collected from the user by an analytics server system, wherein said analytics server system is independent of said web server;
grouping, with said analytics server system, said monitored action data with identical session IDs into session groups in random access memory prior to storage in a relational database;
inserting, with said analytics server system, at least one segmentation ID into each session of said session groups, each of said at least one segmentation ID defining a property of interest to a client, wherein said at least one segmentation ID is used to filter said session groups into session groups that exhibit the property of interest;
transforming said monitored action data into different formats;
sending said transformed monitored action data using various messaging systems for output to different targets, wherein said sending of said transformed monitored action data using various messaging systems for output to different targets comprises real time in-memory streaming from the random access memory prior to the storage in the relational database;
storing in memory data based on a defined policy in a hierarchical common storage; and
issuing a flag indicating a potential fraud in response to determining from said monitored action data a number of clicks on an advertisement exceeding a threshold number.

2. The method of claim 1 wherein said grouping further comprises:
sending said monitored action data and session ID to a temporary storage in said analytics server system;
examining said temporary storage by a plurality of collectors, each collector forwarding monitored action data with the same session ID to one message queue of a plurality of hashed message queues; and
receiving at least one of said hashed message queues at a session transformer and assembling data from said at least one of said hashed massage queues with the same session ID into a first session group.

3. The method of claim 2 wherein said first session group is a format supporting flat file organization.

4. The method of claim 1 wherein data from said session groups are aggregated by at least one time interval.

5. The method of claim 4 wherein said at least one time interval is an interval between a five seconds and ten minutes.

6. The method of claim 1 wherein said grouping is done by a session transformer, said session transformer further calculating session metrics.

7. The method of claim 6 wherein said session metrics include at least one of a session length, a number of items browsed and identification of a first and last page of said session.

8. The method of claim 1 wherein said session groups are organized by sessions on at least one website belonging to a client.

9. A method for tracking web usage data, comprising:
assigning a session ID to a new user session;
including said session ID with monitored action data being collected from a user by an analytics server system;
grouping, with said analytics server system, said monitored action data with identical session IDs into session groups in random access memory prior to storage in a relational database, wherein said session groups are organized as completed sessions, in flight sessions and current snapshots;
detecting, with said analytics server system, fraudulent activity based on a threshold of cock activity within a session group, and flagging the session group as fraudulent;
transforming said monitored action data into different formats;
sending said transformed monitored action data using various messaging systems for output to different targets, wherein said sending of said transformed monitored action data using various messaging systems for output to different targets comprises real time in-memory streaming from the random access memory prior to the storage in the relational database;
storing in-memory data based on a defined policy in a hierarchical common storage; and
issuing a flag indicating a potential fraud in response to determining from said monitored action data a number of cocks on an advertisement exceeding a threshold number.

10. A method for tracking web usage data, comprising:
assigning a session ID to a new user session;
including said session ID with monitored action data being collected from a user by an analytics server system;
sending said monitored action data and session ID to a temporary storage in said analytics server system;
examining said temporary storage by a plurality of collectors, each collector forwarding monitored action data with the same session ID to one message queue of a plurality of hashed message queues, wherein the one message queue of the plurality of hashed message queues is determined based on the same session ID, wherein the forwarding is independent of a session being complete;
receiving at least one of said hashed message queues at a session transformer;
grouping, in said session transformer, said monitored action data with identical session IDs into session groups in random access memory prior to storage in a relational database;
inserting at least one segmentation ID into each session of said session groups, each of said at least one segmentation ID defining a property of interest to a client, wherein said at least one segmentation ID is used to filter said session groups into session groups that exhibit the property of interest;
calculating session metrics in said session transformer, wherein said session metrics include at least one of a session length, a number of items browsed and identification of a first and last page of a session group;
transforming said monitored action data into different formats;
sending said transformed monitored action data using various messaging systems for output to different targets, wherein said sending of said transformed monitored action data using various messaging systems for output to different targets comprises real time in-memory streaming from the random access memory prior to the storage in the relational database;

storing in-memory data based on a defined policy in a hierarchical common storage;

issuing a flag indicating a potential fraud in response to determining from said monitored action data a number of clicks on an advertisement exceeding a threshold number;

wherein said session groups are organized as completed sessions, in flight sessions and current snapshots; and wherein data from said session groups are aggregated by at least one time interval.

11. A web analytics server system for tracking web usage data, comprising:

a web server computer configured to receive through a computer network, user monitored action data including a session ID identifying a new user session, wherein said user monitored action data records web usage of web pages provided by a second web server;

a collector server for forwarding the monitored action data with the same session ID to a queue; and a session transformer engine for receiving said queue and grouping said monitored action data with identical session IDs into session groups hi random access memory within the web analytics server system prior to storage in a relational database, said session transformer engine inserting at least one segmentation ID into each session of said session groups, each of said at least one segmentation ID defining a property of interest to a client, wherein said at least one segmentation ID is used to filter said session groups into session groups that exhibit the property of interest;

wherein said session transformer engine transforms said monitored action data into different formats and sends said transformed monitored action data using various messaging systems for output to different targets, wherein said sending of said transformed monitored action data using various messaging systems for output to different targets comprises real time in memory streaming from the random access memory prior to the storage in the relational database;

wherein said session transformer engine stores in-memory data based on a defined policy in a hierarchical common storage; and wherein said session transformer engine issues a flag it a potential fraud in response to determining from said monitored action data a number of cocks on an advertisement exceeding a threshold number.

12. The system of claim 11 further comprising:

a temporary storage associated with said web server computer for receiving said monitored action data and session ID;

said collector server being one of a plurality of collectors configured to examine said temporary storage, each collector forwarding monitored action data with the same session ID to one message queue of a plurality of hashed message queues; and said session transformer engine being one of a plurality of session transformers, each session transformer receiving at least one of said hashed message queues and assembling data from said at least one of said hashed message queues with the same session ID into a first session group.

13. The system of claim 12 wherein said first session group is a format supporting flat the organization.

14. The system of claim 12 wherein said session groups are organized as completed sessions, in flight sessions and current snapshots.

15. The system of claim 12 wherein data from said session groups are aggregated in said session transformer engine by at least one time interval.

16. The system of claim 15 wherein said at least one time interval is an interval between a five seconds and ten minutes.

17. The system of claim 15 wherein said session transformer engine further calculates session metrics.

18. The system of claim 17 wherein said session metrics include at least one of a session length, a number of items browsed and identification of a first and last page of a session.

19. The system claim 11 wherein said session groups are organized by sessions on at least one website belonging to a client.

20. The system of claim 11 wherein said session transformer engine is configured to organize data by segments.

21. The system of claim 11 further comprising nonvolatile storage associated with said session transformer engine for periodically storing a current session snapshot using hash buckets to store the monitored action data in flat flies.

22. The system of claim 21 wherein said collector server is configured to, after a crash, pull the monitored action data again, and send it to the session transformer engine to reperform all operations of the session transformer engine.

23. A web analytics server system for tracking web usage data, comprising a web server computer configured to receive through a computer network, user monitored action data including a session ID identifying a new user session;

a temporary storage associated with said web server computer for receiving said monitored action data and said session ID;

a plurality of collector servers configured to examine said temporary storage, each collector server forwarding monitored action data with a same session ID to one message queue of a plurality of hashed message queues, wherein the one message queue of the plurality of hashed message queues is determined based on the same session ID, wherein the forwarding is independent of a session being complete;

a plurality of session transformer engines, each session transformer engine receiving at least one of said hashed message queues and assembling data from said at least one of said hashed messages queues with the same session ID into a session group in random access memory within the web analytics server system prior to storage in a relational database, a session transformer of said plurality of session transformer engines inserting at least one segmentation ID into each session of said session groups, each of said at least one segmentation ID defining a property of interest to a client, wherein said at least one segmentation ID is used to filter said session groups into session groups that exhibit the property of interest;

said session transformer being configured to calculate session metrics, said session metrics including at least one of a session length, a number of items browsed and identification of a first and last page of a session;

wherein said session transformer transforms said monitored action data into different formats and sends said transformed monitored action data using various messaging systems for output to different targets, wherein said sending of said transformed monitored action data using various messaging systems for output to different targets comprises real time in-memory streaming from the random access memory prior to the storage in the relational database;

wherein said session transformer stores in-memory data based on a defined policy in a hierarchical common storage;

wherein said session transformer issues a flag it a potential fraud in response to determining from said monitored action data a number of clicks on an advertisement exceeding a threshold number;

wherein said session groups are organized as completed sessions, in flight sessions and current snapshots; and wherein data from said session groups are aggregated in said session transformer by at least one time interval.

* * * * *